(12) United States Patent
Erban et al.

(10) Patent No.: US 11,713,045 B2
(45) Date of Patent: Aug. 1, 2023

(54) METHOD AND CONTROL UNIT FOR DETERMINING A FRICTION COEFFICIENT POTENTIAL OF A ROAD SURFACE

(71) Applicant: Robert Bosch GmbH, Stuttgart (DE)

(72) Inventors: Andreas Erban, Loechgau (DE); Nils Hagenlocher, Wannweil (DE); Tobias Oberhardt, Erlenbach (DE); Tobias Hofmann, Untergruppenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 32 days.

(21) Appl. No.: 17/275,346

(22) PCT Filed: Sep. 21, 2019

(86) PCT No.: PCT/EP2019/075436
§ 371 (c)(1),
(2) Date: Mar. 11, 2021

(87) PCT Pub. No.: WO2020/108820
PCT Pub. Date: Jun. 4, 2020

(65) Prior Publication Data
US 2022/0048516 A1 Feb. 17, 2022

(30) Foreign Application Priority Data

Nov. 29, 2018 (DE) .......................... 102018220576.0

(51) Int. Cl.
*B60W 40/068* (2012.01)
*B60W 30/18* (2012.01)
(52) U.S. Cl.
CPC .... *B60W 40/068* (2013.01); *B60W 30/18145* (2013.01); *B60W 2520/26* (2013.01);
(Continued)

(58) Field of Classification Search
CPC ......... B60W 40/068; B60W 30/18145; B60W 2520/26; B60W 2552/40; B60W 2720/14;
(Continued)

(56) References Cited

U.S. PATENT DOCUMENTS 5,173,860 A * 12/1992 Walenty .................. B60T 8/172
701/75
5,517,414 A * 5/1996 Hrovat ................... B60K 28/16
701/91

(Continued)

FOREIGN PATENT DOCUMENTS

DE 102010047443 A1 4/2012
DE 102013226997 A1 6/2015
(Continued)

OTHER PUBLICATIONS

International Search Report for PCT/EP2019/075436, dated Feb. 6, 2020.

*Primary Examiner* — Jeff A Burke
*Assistant Examiner* — Kyle T Johnson
(74) *Attorney, Agent, or Firm* — Norton Rose Fulbright US LLP; Gerard Messina (57) ABSTRACT

A method for determining a friction coefficient potential of a road surface. A total torque for operating a vehicle is unequally distributed among at least two wheel torques at wheels of the vehicle. The friction coefficient potential is ascertained using a detected slip between the road surface and at least one of the wheels and the wheel torque present at the wheel.

9 Claims, 4 Drawing Sheets

(52) U.S. Cl.
    CPC ..... *B60W 2552/40* (2020.02); *B60W 2720/14* (2013.01); *B60W 2720/30* (2013.01)

(58) Field of Classification Search
    CPC ............ B60W 2720/30; B60T 2201/16; B60T 2210/12; B60T 2270/303; B60T 8/172
    See application file for complete search history.

(56) References Cited

U.S. PATENT DOCUMENTS

| | | | | |
|---|---|---|---|---|
| 8,825,335 | B2* | 9/2014 | Rylander | G06F 17/00 701/82 |
| 11,091,164 | B2* | 8/2021 | Jonasson | B60W 10/18 |
| 2004/0040375 | A1* | 3/2004 | Kadota | B60L 50/16 903/902 |
| 2006/0015236 | A1* | 1/2006 | Yamaguchi | B60K 17/358 180/242 |
| 2006/0074530 | A1* | 4/2006 | Meyers | B60W 10/119 701/1 |
| 2007/0225896 | A1* | 9/2007 | Steimel | B60T 8/1766 701/124 |
| 2008/0264709 | A1* | 10/2008 | Fenker | B60W 30/18172 180/197 |
| 2009/0012685 | A1* | 1/2009 | Maeda | B60W 30/02 701/70 |
| 2010/0114449 | A1* | 5/2010 | Shiozawa | B62D 6/005 701/90 |
| 2011/0257826 | A1* | 10/2011 | Yu | B60W 30/045 701/41 |
| 2014/0145498 | A1* | 5/2014 | Yamakado | B60W 10/08 303/3 |
| 2015/0224925 | A1* | 8/2015 | Hartmann | B60W 40/068 348/148 |
| 2016/0121902 | A1* | 5/2016 | Huntzicker | B60W 40/068 701/1 |
| 2016/0236672 | A1* | 8/2016 | Yanagida | B60W 10/06 |
| 2018/0126997 | A1* | 5/2018 | Offenhaeuser | G08G 1/0112 |
| 2018/0354476 | A1* | 12/2018 | Tagesson | B60T 8/1755 |
| 2019/0031162 | A1* | 1/2019 | Besier | B60T 8/176 |
| 2019/0176812 | A1* | 6/2019 | Hirata | B60W 30/045 |
| 2019/0241176 | A1* | 8/2019 | Suzuki | B60W 30/02 |
| 2019/0344796 | A1* | 11/2019 | Lian | B60W 30/18172 |
| 2020/0079229 | A1* | 3/2020 | Torres | B60L 15/2036 |
| 2021/0188252 | A1* | 6/2021 | Lu | B60W 40/12 |

FOREIGN PATENT DOCUMENTS

| | | | |
|---|---|---|---|
| DE | 102015118447 A1 | 5/2016 | |
| EP | 3398825 A1 | 11/2018 | |
| JP | 2003237558 A | 8/2003 | |
| JP | 2005207953 A | 8/2005 | |
| JP | 2005306082 A | 11/2005 | |
| JP | 2015521553 A | 7/2015 | |
| JP | 2018069906 A | 5/2018 | |
| JP | 2019178843 A | 10/2019 | |
| WO | WO-2011075014 A1 * | 6/2011 | .......... B60W 50/082 |

\* cited by examiner

METHOD AND CONTROL UNIT FOR DETERMINING A FRICTION COEFFICIENT POTENTIAL OF A ROAD SURFACE

FIELD

The present invention relates to a method and to a control unit for determining a friction coefficient potential of a road surface.

BACKGROUND INFORMATION

When a wheel rolls freely on a ground surface, no slip arises at the wheel between the wheel and the ground surface. However, when the wheel is driven or decelerated, slip arises. The slip is dependent, among other things, on a vertical force of the wheel and a friction coefficient potential of the ground surface. The friction coefficient potential represents the portion of the vertical force which the wheel is able to transfer as frictional force onto the ground surface for driving, deceleration, and for cornering forces, i.e., for steering.

The critical slip is present at the transition of the wheel from the stable into the unstable slip range. In the case of critical slip, the friction coefficient potential is fully exhausted and may thus be exactly determined.

SUMMARY

In accordance with an example embodiment of the present invention, a method for determining a friction coefficient potential of a road surface, a corresponding control unit, as well as finally a corresponding computer program product and a machine-readable memory medium are provided. Advantageous refinements, improvements, and embodiments of the present invention here are derived from the disclosure herein.

Specific embodiments of the present invention may advantageously make it possible to determine the friction coefficient potential of a road surface at the positions of the wheels of a vehicle at any time, without having to operate the vehicle in a limit range for this purpose. The friction coefficient potential at the location of a center of gravity of the vehicle may be inferred from these pieces of information. The friction coefficient potential may be assigned to the location and/or the positions and stored in a friction coefficient map. The friction coefficient map may be used by many vehicles to plan and execute driving maneuvers with increased safety.

A method for determining a friction coefficient potential of a road surface is introduced, which is characterized in that a total torque for operating a vehicle is unequally distributed among at least two wheel torques at wheels of the vehicle, the friction coefficient potential being ascertained using a detected slip between the road surface and at least one of the wheels and the wheel torque present at the wheel.

Specific embodiments of the present invention may be considered to be based, among other things, on the concepts and findings described hereafter.

In accordance with an example embodiment of the present invention, slip is generated at at least two wheels of a driving vehicle, without a planned driving task of the vehicle being considerably changed. Even a minor slip at at least one of the wheels may be detected. When the slip and the framework conditions of the slip, such as wheel forces, are known, the friction coefficient potential may be ascertained.

In the process, it is possible to differentiate between different friction coefficients. A first friction coefficient is the instantaneously used friction coefficient corresponding to the particular slip. This thus depends on instantaneously acting longitudinal and lateral forces. A second friction coefficient denotes the possible maximum, i.e., the friction coefficient which correlates with the slip at which the greatest longitudinal force may be transferred. The second friction coefficient may be referred to as friction coefficient potential. There is no pure adhesion and sliding with rubber friction.

The friction coefficient potential may be referred to as coefficient of friction. The friction coefficient potential describes a relationship between a vertical force of a wheel of the vehicle and a frictional force maximally achievable at the wheel. Since the wheel remains approximately unchanged, the friction coefficient potential is essentially dependent on a road surface or a condition of the road surface. The lower the friction coefficient potential of the road surface, the greater the slip of a wheel on the road surface becomes at the same wheel torque.

Exceptions thereof exist in the unstable slip range, for example. There are ground surfaces having high friction coefficient potentials and very high critical slip, which require a lot of slip to achieve high used friction coefficients. Conversely, there are also ground surfaces which have a very low friction coefficient potential at extremely low critical slip.

A total torque may be positive or negative, i.e., a drive torque or a braking torque. If the friction coefficient potential is not to be determined, the total torque is distributed among the wheels of the vehicle in such a way that a moment distribution results that is as uniform or unbraced as possible. However, a uniform distribution is not a prerequisite. In principle, an arbitrary vehicle controller may design the moment distribution prior to interlocking. In the process, all wheels may approximately have the same amount of slip. In accordance with an example embodiment of the present invention, an intervention in the moment distribution takes place, and the moment distribution is changed in such a way that at least two wheels of the vehicle are braced with respect to one another. In the process, one wheel operates against the other. For example, a larger wheel torque may be applied to one wheel than to the other wheel. In this way, the one wheel transfers more force onto the ground surface than the other wheel. It is also possible for the one wheel to be driven, while the other wheel is decelerated. As an alternative, it is also possible for the one wheel to be driven or decelerated, while the other wheel is rolling freely.

The slip may be measured, i.e., detected, at at least one wheel and mapped in a slip value. For this purpose, for example, initially a friction velocity of the wheel may be detected, and a slip value may be formed therefrom. The slip may be measured when another wheel of the vehicle rolls freely. If there is no freely rolling wheel, the slip may be estimated since the vehicle reference velocity is only estimated. The slip may also be estimated at all wheels. For the approach described here, however, it is only necessary to measure or estimate the slip at one wheel.

The vertical force of the wheel is known, may be estimated or may be determined with the aid of a sensor in the chassis. Using the slip or the slip value, the wheel torque, and the vertical force, the friction coefficient potential may be calculated.

To support the negotiation of a curve by the vehicle, the wheel torques may be distributed asymmetrically with respect to a longitudinal axis of the vehicle to generate a yaw moment supporting the negotiation of the curve. For example, a so-called torque vectoring at the vehicle may be supported to determine the friction coefficient potential during the negotiation of the curve. To support or not interfere with straight-ahead driving of the vehicle, the wheel torques may be distributed symmetrically with respect to the longitudinal axis. As a result of the symmetrical distribution, the friction coefficient potential may be determined at any time, even when driving straight ahead.

The wheel torques may be applied to wheels situated on different axles of the vehicle. For example, the one wheel torque may be applied to a wheel of the rear axle, and the other wheel torque may be applied to a wheel of the front axle. In the case of a vehicle including more than two axles, a different distribution may also be used. Due to the use of different axles, a yaw moment at the vehicle may be limited or avoided, or deliberately generated.

A wheel torque having a minimum value may be applied at least at the wheel whose slip is used for ascertaining the friction coefficient potential. A minimum value of the wheel torque may be necessary to obtain a determinable slip. The wheel torque of the wheel may be accordingly increased. At the other wheel, the wheel torque may be accordingly decreased to compensate for the increased wheel torque.

Oppositely acting wheel torques may be applied at the wheels if the total torque is lower than the minimum value. When the total torque is too low, for example during an acceleration-free driving operation of the vehicle, the wheel torque having the minimum value may be applied at one of the wheels, and the wheel torque having the opposite effective direction may be applied at the other wheel. The wheel torque at the other wheel may have up to a negative minimum value. In this way, it is possible to determine the friction coefficient potential even when the originally requested total torque is too low to generate the slip which is required for determining the friction coefficient potential.

At least one wheel of the vehicle may be set to be freely rolling. A velocity of the vehicle may be detected at the freely rolling wheel. A freely rolling wheel does not have any slip. The freely rolling wheel may thus be used as a reference for the actual velocity of the vehicle. Using the velocity, the slip at the other wheels may be determined with high precision.

At one wheel, the wheel torque may be applied up to a positive or negative maximum torque of an electric motor driving the wheel in a wheel-specific manner. Using electric motors, the wheel torque may be set particularly well. A braking torque may be set without the use of friction brakes. When the wheel torque is limited to the maximum torque, it is ensured that no additional torques which cannot be controlled as well are present at the wheels.

The friction coefficient potential may be ascertained using a slip difference between the slips of the wheels and a torque difference between the wheel torques of the wheels. The slip may furthermore be determined at at least the other wheel. The wheel torques may be set in such a way that the torque difference results. Torques and slips may be evaluated to ascertain the friction coefficient potential.

The method in accordance with the present invention may, for example, be implemented in software or hardware or in a mixed form made up of software and hardware, for example in a control unit.

The present invention furthermore provides a control unit which is designed to carry out, control or implement the steps of one variant of the method(s) described here in corresponding devices.

The control unit may include an electrical device including at least one processing unit for processing signals or data, at least one memory unit for storing signals or data, and at least one interface and/or one communication interface for reading in or outputting data, which are embedded into a communication protocol. The processing unit may be a signal processor, for example, a so-called system ASIC or a microcontroller for processing sensor signals and outputting data signals as a function of the sensor signals. The memory unit may, for example, be a Flash memory, an EPROM or a magnetic memory unit. The interface may be designed as a sensor interface for reading in the sensor signals from a sensor and/or as an actuator interface for outputting the data signals and/or control signals to an actuator. The communication interface may be designed to read in or output the data in a wireless and/or hard-wired manner. The interfaces may also be software modules which are present on a microcontroller, for example, alongside other software modules.

In addition, a computer program product or computer program is advantageous, having program code which may be stored on a machine-readable carrier or memory medium such as a semiconductor memory, a hard disk memory or an optical memory, and which is used to carry out, implement and/or control the steps of the method according to one of the specific embodiments described above, in particular if the program product or program is executed on a computer or a device.

It is pointed out that several of the possible features and advantages of the present invention are described herein with reference to different specific embodiments. Those skilled in the art will recognize that the features of the control unit and of the method may be suitably combined, adapted or exchanged to arrive at further specific embodiments of the present invention.

BRIEF DESCRIPTION OF THE DRAWINGS

Specific example embodiments of the present invention are described hereafter with reference to the figures; neither the figures nor the description should be interpreted as limiting the present invention.

The figures are only schematic representations and are not true to scale. Identical reference numerals denote identical or equally-acting features in the figures.

DETAILED DESCRIPTION OF EXAMPLE EMBODIMENTS

Figure 1:
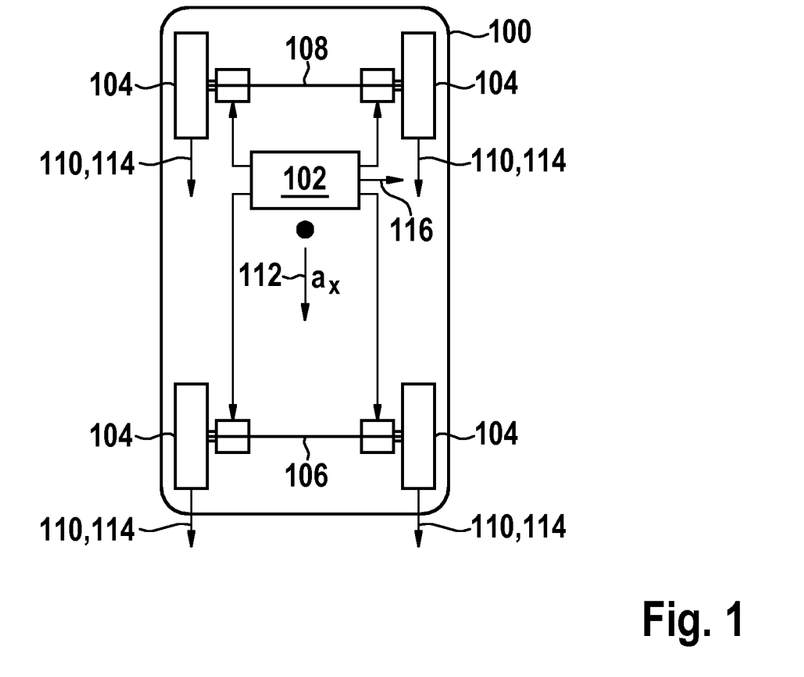
FIG. 1 shows a representation of a vehicle including a control unit according to one exemplary embodiment of the present invention.

FIG. 1 shows a representation of a vehicle 100 including a control unit 102 according to one exemplary embodiment. The vehicle includes four wheels 104, which are distributed among a front axle 106 of vehicle 100 and a rear axle 108 of vehicle 100. All wheels 104 are driven here, or may be driven individually. In the exemplary embodiment shown here, all wheels 104 are connected to a dedicated electric motor. The electric motors may provide a drive torque or a braking torque at wheels 104. In the case of wheel-specific electric motors, there is no axle in the traditional sense, and no rigid connection between the wheels 104 of the axle.

Control unit 102 is integrated into the infrastructure of vehicle 100 in such a way that an individual wheel torque 110 may be predefined for each wheel 104 via control signals. The individual wheel torques 110 add up to a total torque 112.

FIG. 1 shows an initial state of vehicle 100 in which control unit 102 does not intervene in a moment distribution between wheels 104 and/or axles 106, 108. A positive total torque 112 or a total force or a total acceleration $a_x$ for operating vehicle 100 is equally distributed among four identical output torques 114 or wheel forces here. All wheels 104 are driven with the same output torque 114 to have vehicle 100 accelerate forward or drive forward at a constant pace.

To increase the slip at at least one of wheels 104, control unit 102 may control the electric motors in such a way that a braced moment distribution results at wheels 104. The slip at wheels 104 is detected in a wheel-specific manner by a slip detection unit. Using wheel torque 110 and the slip of at least one wheel 104, control unit 102 ascertains a friction coefficient potential 116 of road surface beneath wheel 104.

FIGS. 2a through 2e show representations of a vehicle 100 including moment distributions according to exemplary embodiments. Vehicle 100 essentially corresponds to the vehicle in FIG. 1.

Figure 2A:
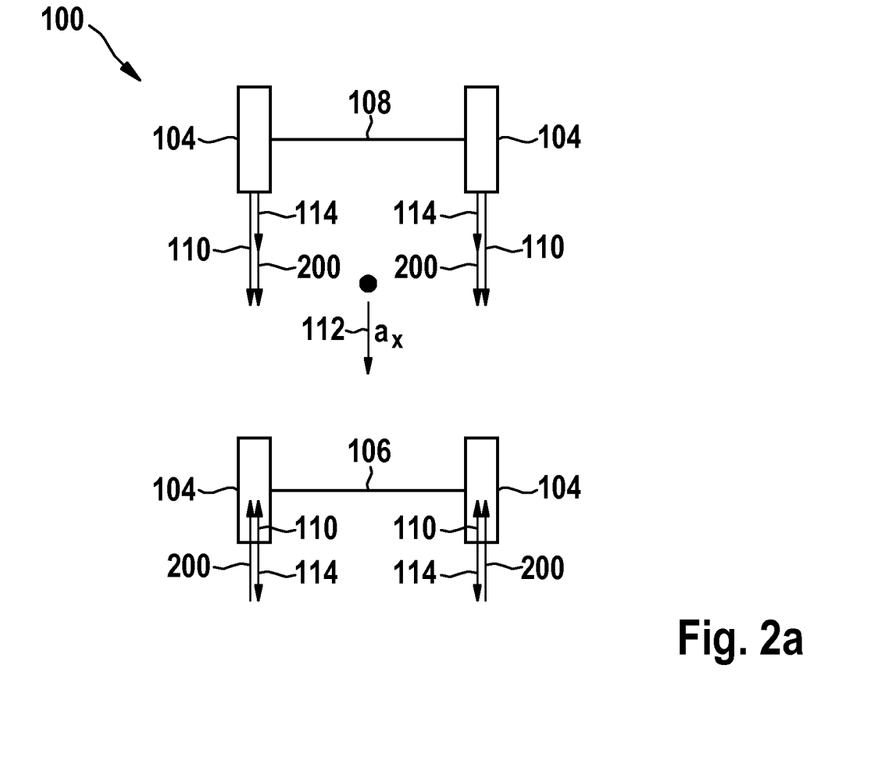
FIGS. 2a through 2e show representations of a vehicle including moment distributions according to exemplary embodiments of the present invention.

In FIG. 2a, the moment distribution is axle-wise braced. Rear axle 108 is pretensioned with respect to front axle 106. In the process, wheels 104 at rear axle 108 are driven with greater wheel torques 110 than wheels 104 at front axle 106. To achieve the bracing, a torque amount 200 has been shifted from output torque 114 of wheels 104 of front axle 106 to wheels 104 of rear axle 108. Total torque 112 remains constant at the value illustrated in FIG. 1 in the process. As a result of the shifted torque amount 200, the resulting wheel torque 110 is negative, and wheels 104 of front axle 106 are decelerated, or recuperation takes place at wheels 104 of front axle 106, while wheels 104 of rear axle 108 are driven that much more.

Figure 2B:
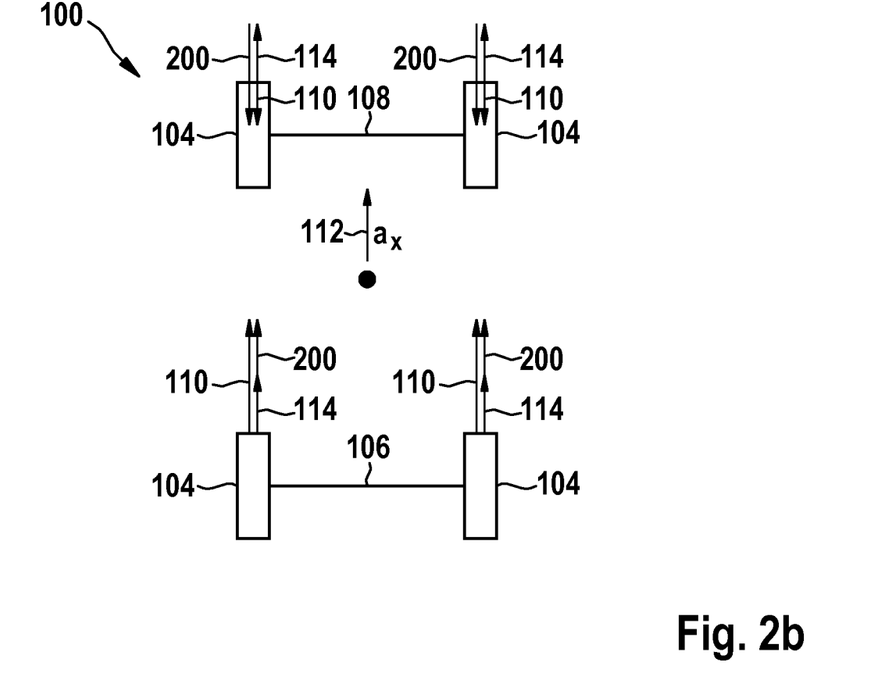

In FIG. 2b, total torque 112 is negative. During a recuperative brake application, the moment distribution is axle-wise braced as in FIG. 2a. Vehicle 100 is entirely decelerated. Here, torque amount 200 has been shifted from output torque 114 of wheels 104 of rear axle 108 to wheels 104 of front axle 106. The resulting wheel torque 110 of wheels 104 of rear axle 108 becomes positive as a result of the shifted torque amount 200. Wheels 104 of rear axle 108 are thus driven, while wheels 104 of front axle 106 are decelerated that much more.

Figure 2C:
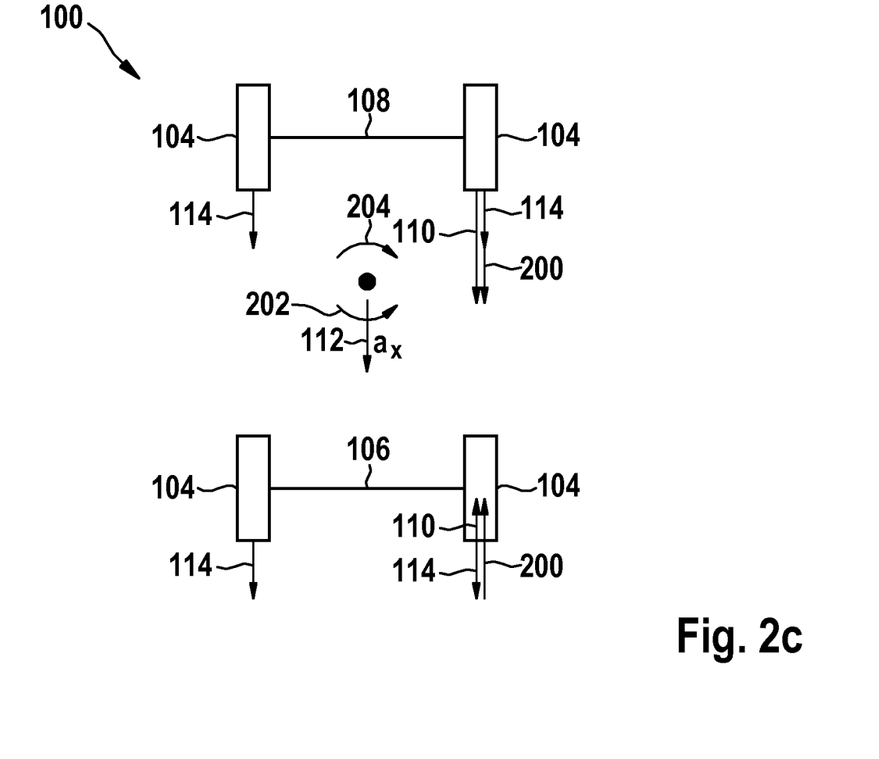

In FIG. 2c, the moment distribution is braced on one side. For this purpose, one wheel 104 at front axle 106 and one wheel 104 at rear axle 108 are braced with respect to one another as in FIG. 2a. In contrast, the respective other wheel 104 of front and rear axles 106, 108 continues to be operated with output torque 114. Yaw moments 202, 204 arise due to the one-sided pretension. Yaw moment 202 through front wheel 104 is compensated for by the opposite yaw moment 204 through rear wheel 104.

Figure 2D:
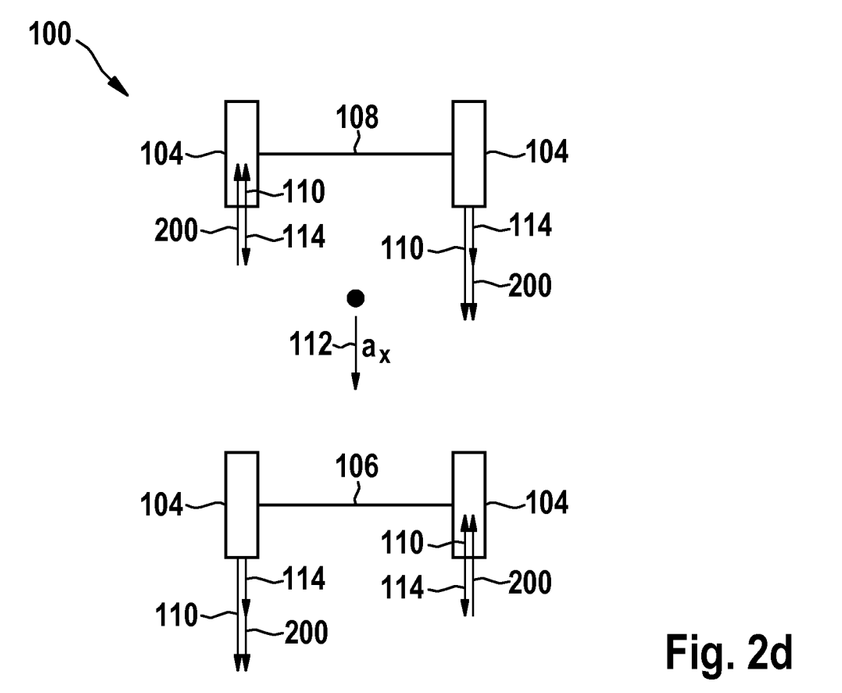

In FIG. 2d, the moment distribution is diagonally braced. Torque amount 200 is shifted from the rear to the front on the right vehicle side, while torque amount 200 is shifted from the front to the rear on the left vehicle side. The respective resulting yaw moments compensate for one another.

Figure 2E:
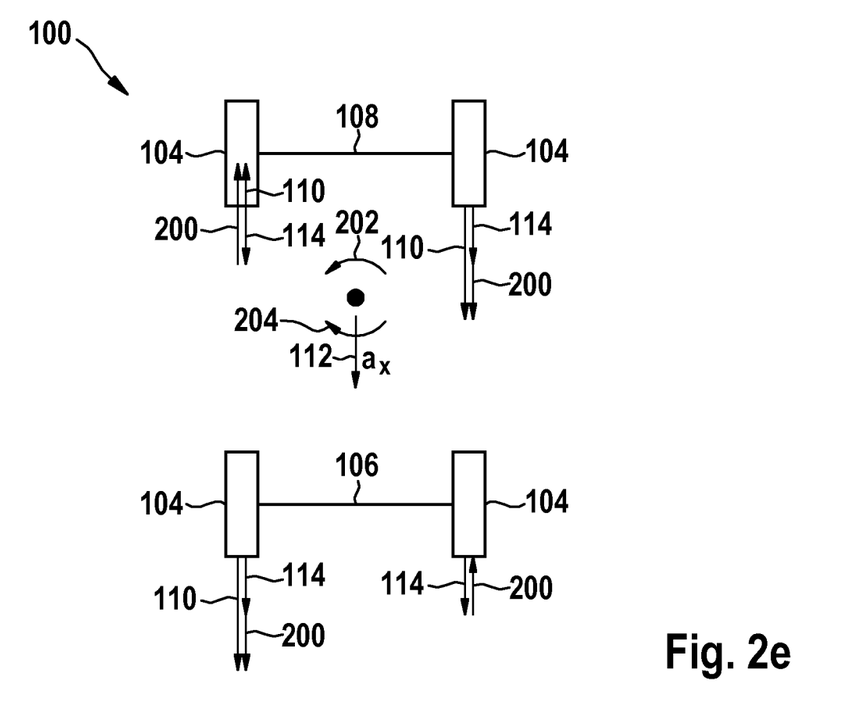

In FIG. 2e, the moment distribution is asymmetrical, while one wheel 104 rolls freely. No slip arises at the freely rolling wheel 104 without resulting wheel torque. As a result, a velocity of vehicle 100 may be detected particularly well at the freely rolling wheel 104.

To compensate the absent drive torque of the freely rolling wheel, the moment distribution of the other three wheels 104 is set in such a way that it does not cause any yaw moment. Here, the left front wheel 104 rolls freely. The right front wheel 104 and the left rear wheel 104 are driven more forcefully for this purpose. The right rear wheel 104 is decelerated.

Figure 3A:
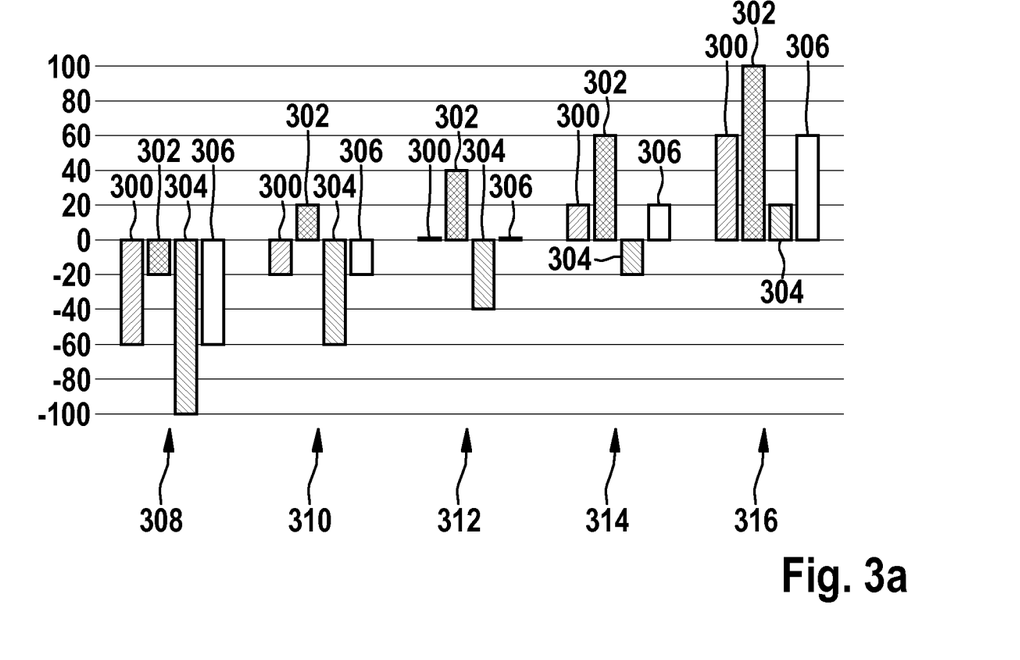
FIGS. 3a, 3b show representations of moment distributions according to exemplary embodiments of the present invention.
Figure 3B:
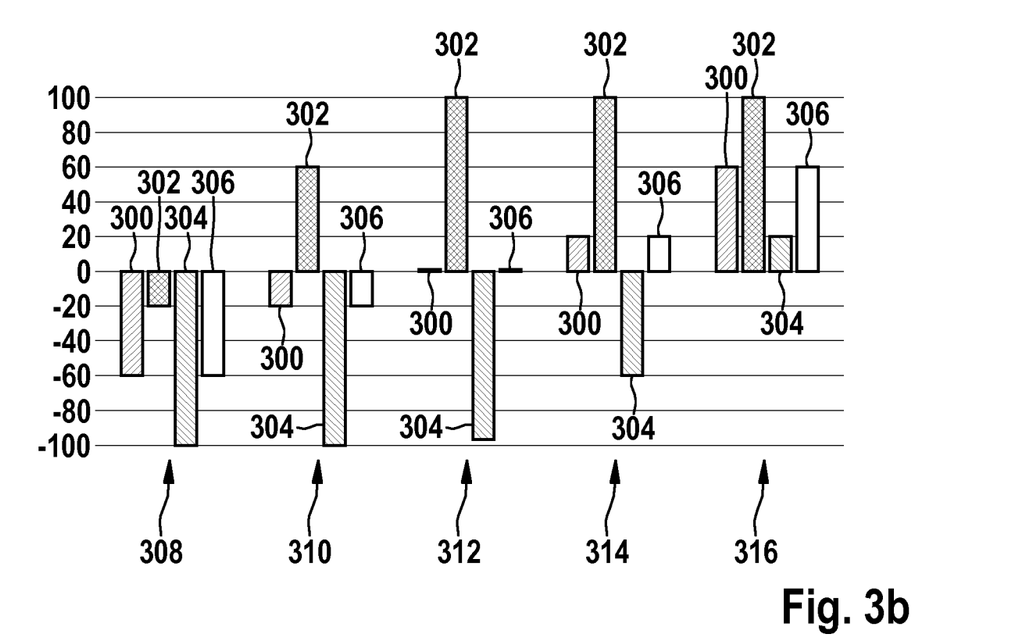

FIGS. 3a and 3b show representations of moment distributions according to exemplary embodiments. The moment distributions show an average moment request 300, a moment 302 of the increased wheels, a moment 304 of the reduced wheels, and a resulting moment 306. The resulting moment corresponds to a quarter of the total torque in FIGS. 2a through 2e. In the process, moment 302 of the increased wheels in all cases compensates for moment 304 of the reduced wheels so that the resulting moment 306 is always equal to moment request 300.

The moment distributions are illustrated for different situations. In a first situation 308, a strong deceleration is requested. In a second situation 310, a slight deceleration is requested. In a third situation 312, constant driving is requested. In a fourth situation 314, a slight acceleration is requested. In a fifth situation 316, a strong acceleration is requested.

In FIG. 3a, a constant difference between moment 302 of the increased wheels and moment 304 of the reduced wheels is set in each situation. Here, a maximum torque of the electric motors at the wheels is only requested in first situation 308 of the strong deceleration, and in fifth situation 316 of the strong acceleration.

In FIG. 3b, a maximum possible difference between moment 302 of the increased wheels and moment 304 of the reduced wheels is set in each situation. Here, the maximum torque of the electric motors is requested in each situation. In situation 312 of constant driving, the maximum torque is even requested in opposite directions.

In other words, a method for enabling friction coefficient estimations in vehicles including independently driven axles or wheels in driving situations with low friction coefficient utilization is described.

In future, more highly automated functions, the vehicle will possibly also independently cope with critical situations without the intervention of the driver. Ideally, the vehicle should therefore preventatively avoid critical situations. For this purpose, pieces of information regarding the friction coefficient potential of the tire-road pairing are necessary since this determines the stopping distance and the maximum curve velocity. In the process, in turn, the topic of linking vehicles plays an important role to be able to predict critical friction coefficients and preventatively respond to them. Linked vehicles may thus offer considerable improvements of the driving comfort and the driving safety.

Using existing sensor systems and with the aid of existing models from the ESP system and steering systems, an estimation of the instantaneously utilized friction coefficient is possible. As the vehicle accelerates or decelerates, the friction coefficient estimators ascertain the utilized friction coefficients. In the case of an active control intervention of certain safety systems (ABS, TCS and partially ESP), the existing friction coefficient potential is exhausted and may be exactly ascertained.

In the free rolling case, i.e., without acceleration or deceleration, it is not possible thus far to estimate a road friction coefficient. To create a friction coefficient map, e.g., it is important to ascertain friction coefficients as often as possible. Since control interventions are rare in the everyday driving operation, slip-based estimation methods may be used, for example, which ascertain the maximum friction coefficient from the slip and the force in partial decelerations and partial accelerations.

Driving situations with partial brake applications and partial accelerations, as are required for the estimation using slip-based methods, occur considerably more frequently than full decelerations and accelerations with maximum drive torque, but are nonetheless too rare in moving traffic on expressways and federal highways to generate comprehensive pieces of friction coefficient information. To increase the scope covered by such methods, the approach described here offers the option of manipulating the slip state, and the friction coefficient utilization of the wheels associated therewith, and thereby being able to generate pieces of friction coefficient information during a majority of everyday driving situations. Wear and energy efficiency are influenced only negligibly by the approach described here.

Electrified vehicles including certain drive topologies offer the option of bringing individual axles or individual wheels deliberately into different slip states. A four-wheel drive is a prerequisite, in which the front and rear axles may be driven independently, and at least one axle is driven purely electrically. A wheel-specific electric drive at one axle or both axles offers further options, but is not necessary.

The slip states are caused by the generation of a wheel torque difference (identical wheel diameters are assumed, differences in the case of mixed tires may be compensated for) between the two axles or individual wheels. In this way, it is possible, even in driving situations having very low friction coefficient utilization (e.g., constant driving), to generate the slip state of a partial brake application at one axle or one wheel, and the slip state of a partial acceleration at the other axle or another wheel, which may then be used for friction coefficient estimation using conventional methods.

During the generation of the moment difference, the total moment is maintained corresponding to the request of the driver or an active autonomous driving function. For this purpose, either an established moment difference is generated, or an axle or a wheel is brought to the moment limit of the drive. In the process, the available moment potential at the wheel level is ascertained and taken into consideration with respect to drive or recuperation. Furthermore, no additional resulting yaw moment is generated. The drive torque which is additionally exerted at an axle or a wheel to generate a higher drive slip is thus compensated for by reducing the moment at the other axle or the other wheels, different distributions being possible depending on the drive topology and driving situation. In many driving situations, this reduction takes place up to the range of the braking torque.

The reduction is particularly advantageously possible by a purely electrically driven axle since it is able to exert the braking torque by recuperation, i.e., by the operation of the electric machine as a generator. In this way, the excess energy introduced at the driven axle is not dissipated in heat by the friction brake, but is returned to the traction battery, by which the energy efficiency of the vehicle is only slightly negatively influenced by the estimation method compared to the use of the friction brake. Furthermore, there is no additional wear and fine dust generated at the friction brakes.

Recuperation may additionally be used to also estimate the friction coefficient in driving situations including deceleration, in addition to situations including constant driving and acceleration, provided the deceleration is achieved by recuperation. Here, the electrically generated braking force is increased at one axle and is compensated for by a reduction of the recuperation or the exertion of a traction force at the second axle. The method may also be used with stronger deceleration and acceleration, a lesser moment difference being provided, and thus the energy balance being further improved.

Another advantage of electrically driven axles is that the drive and braking torques are more precisely known than in the case of combustion engines or friction brakes. In this way, it is possible to measure the relationship between the slip state and the longitudinal force, which forms the basis for a friction coefficient estimation, at electrically driven axles with high accuracy. In addition, a simultaneous measurement of the drive and braking behaviors is possible with two electrically driven axles, which also increases the accuracy. Wheel-specific drives offer a third option for improving the accuracy. A wheel may then be set as freely rolling to directly measure a slip-free vehicle reference velocity.

Based on a real-time analysis of the friction coefficient map, it is possible to establish in which regions/on which roads presently no pieces of instantaneous friction coefficient information are available. Based thereon, vehicles in the corresponding region may be selected for friction coefficient measurement tasks in a very deliberate manner. For reasons of material wear, care may accordingly be taken to ensure a fair distribution of the friction coefficient measurement maneuvers among the vehicles in question. The approach is also very well-suited for a measuring vehicle which may be sent off to very deliberately collect pieces of friction coefficient information.

In closing, it shall be pointed out that terms such as "including," "having," etc. do not exclude other elements or steps, and that terms such as "a" or "an" do not exclude a plurality.

What is claimed is:

1. A method for determining a friction coefficient potential of a road surface, the method comprising:
    unequally distributing a total torque for operating a vehicle among at least two wheel torques at wheels of the vehicle;
    ascertaining the friction coefficient potential using a detected slip between the road surface and at least one of the wheels and a wheel torque present at the at least one of the wheels;
    wherein the friction coefficient potential is ascertained using a slip difference between slips of the wheels and a torque difference between torques of the wheels,
    wherein the friction coefficient potential is assigned to a location and/or a position and stored in a friction coefficient map,
    wherein each of the wheels is coupled to an electric motor, which provides a drive torque and a braking torque,
    wherein the braking torque is provided by the electric motor and not a friction brake,
    wherein when an intervention in a moment distribution takes place, the moment distribution is changed so that at least two wheels of the vehicle are braced with respect to one another, so that one wheel operates against another of the wheels,
    wherein to increase the slip at at least one of the wheels, electric motors are controlled so that a braced moment distribution results at the wheels, and the slip at the wheels is detected in a wheel-specific manner, wherein the moment distribution is axle-wise braced when the rear axle is pretensioned with respect to the front axle,
wherein for recuperative braking, the moment distribution is axle-wise braced,
wherein the moment distribution is braced on one side by providing that one of the wheels at the front axle and one of the wheels at the rear axle are braced with respect to one another,
wherein the moment distribution is diagonally braced when a torque amount is shifted from the rear to the front on the right vehicle side, while the torque amount is shifted from the front to the rear on the left vehicle side, so that resulting yaw moments compensate for one another, and
wherein the moment distribution is asymmetrical when one of the wheels rolls freely, so that no slip arises at the freely rolling wheel.

2. The method as recited in claim 1, wherein the wheel torques are distributed asymmetrically with respect to a longitudinal axis of the vehicle to support a negotiation of a curve by the vehicle, to generate a yaw moment supporting the negotiation of the curve, and the wheel torques are distributed symmetrically with respect to the longitudinal axis to support straight-ahead driving of the vehicle.

3. The method as recited in claim 1, wherein the wheel torques are applied at wheels situated on different axles of the vehicle.

4. The method as recited in claim 1, wherein a wheel torque of the wheel torques having a minimum value is applied at least at the at least one of the wheels whose slip is used for ascertaining the friction coefficient potential.

5. The method as recited in claim 4, wherein oppositely acting wheel torques are applied at the wheels when the total torque is lower than the minimum value.

6. The method as recited in claim 1, wherein at least one wheel of the wheels of the vehicle is set to be freely rolling, a velocity of the vehicle being detected at the freely rolling wheel.

7. The method as recited in claim 1, wherein, for at least one wheel of the wheels, a wheel torque is applied up to a positive or negative maximum torque of an electric motor driving the wheel in a wheel-specific manner.

8. A control apparatus to determine a friction coefficient potential of a road surface, comprising:
a control unit configured to perform the following:
unequally distributing a total torque for operating a vehicle among at least two wheel torques at wheels of the vehicle; and
ascertaining the friction coefficient potential using a detected slip between the road surface and at least one of the wheels and a wheel torque present at the at least one of the wheels;
wherein the friction coefficient potential is ascertained using a slip difference between slips of the wheels and a torque difference between torques of the wheels,
wherein the friction coefficient potential is assigned to a location and/or a position and stored in a friction coefficient map,
wherein each of the wheels is coupled to an electric motor, which provides a drive torque and a braking torque,
wherein the braking torque is provided by the electric motor and not a friction brake,
wherein when an intervention in a moment distribution takes place, the moment distribution is changed so that at least two wheels of the vehicle are braced with respect to one another, so that one wheel operates against another of the wheels,
wherein to increase the slip at at least one of the wheels, electric motors are controlled so that a braced moment distribution results at the wheels, and the slip at the wheels is detected in a wheel-specific manner,
wherein the moment distribution is axle-wise braced when the rear axle is pretensioned with respect to the front axle,
wherein for recuperative braking, the moment distribution is axle-wise braced,
wherein the moment distribution is braced on one side by providing that one of the wheels at the front axle and one of the wheels at the rear axle are braced with respect to one another,
wherein the moment distribution is diagonally braced when a torque amount is shifted from the rear to the front on the right vehicle side, while the torque amount is shifted from the front to the rear on the left vehicle side, so that resulting yaw moments compensate for one another, and
wherein the moment distribution is asymmetrical when one of the wheels rolls freely, so that no slip arises at the freely rolling wheel.

9. A non-transitory machine-readable memory medium, on which is stored a computer program, which is executable by a processor, comprising:
a program code arrangement having program code for determining a friction coefficient potential of a road surface by performing the following:
unequally distributing a total torque for operating a vehicle among at least two wheel torques at wheels of the vehicle; and
ascertaining the friction coefficient potential using a detected slip between the road surface and at least one of the wheels and a wheel torque present at the at least one of the wheels;
wherein the friction coefficient potential is ascertained using a slip difference between slips of the wheels and a torque difference between torques of the wheels,
wherein the friction coefficient potential is assigned to a location and/or a position and stored in a friction coefficient map,
wherein each of the wheels is coupled to an electric motor, which provides a drive torque and a braking torque,
wherein the braking torque is provided by the electric motor and not a friction brake,
wherein when an intervention in a moment distribution takes place, the moment distribution is changed so that at least two wheels of the vehicle are braced with respect to one another, so that one wheel operates against another of the wheels,
wherein to increase the slip at at least one of the wheels, electric motors are controlled so that a braced moment distribution results at the wheels, and the slip at the wheels is detected in a wheel-specific manner,
wherein the moment distribution is axle-wise braced when the rear axle is pretensioned with respect to the front axle,
wherein for recuperative braking, the moment distribution is axle-wise braced, wherein the moment distribution is braced on one side by providing that one of the wheels at the front axle and one of the wheels at the rear axle are braced with respect to one another, wherein the moment distribution is diagonally braced when a torque amount is shifted from the rear to the front on the right vehicle side, while the torque amount is shifted from the front to the rear on the left vehicle side, so that resulting yaw moments compensate for one another, and wherein the moment distribution is asymmetrical when one of the wheels rolls freely, so that no slip arises at the freely rolling wheel.

* * * * *